US 6,482,627 B1

(12) United States Patent
Dahlstrom

(10) Patent No.: US 6,482,627 B1
(45) Date of Patent: Nov. 19, 2002

(54) COMPOSTING DEVICE WITH INTERNAL AERATION TUBE

(75) Inventor: James L. Dahlstrom, Portland, OR (US)

(73) Assignee: D&P Industries, Inc., Portland, OR (US)

( * ) Notice: Subject to any disclaimer, the term of this patent is extended or adjusted under 35 U.S.C. 154(b) by 0 days.

(21) Appl. No.: 09/839,378

(22) Filed: Apr. 20, 2001

(51) Int. Cl.⁷ .............................................. C12M 1/02
(52) U.S. Cl. ................... 435/209.2; 435/290.3
(58) Field of Search .............. 435/290.1–290.4; 220/484

(56) References Cited

U.S. PATENT DOCUMENTS

| | | | |
|---|---|---|---|
| 3,966,415 A | 6/1976 | Chester | 71/9 |
| 4,687,645 A | 8/1987 | Harvey | 422/184 |
| 4,797,367 A * | 1/1989 | Pinder | 435/313 |
| 5,102,803 A | 4/1992 | Weaver | 435/315 |
| H1149 H * | 3/1993 | Wyman et al. | |
| 5,433,524 A | 7/1995 | Wüster | 366/244 |
| 5,451,523 A | 9/1995 | Nicholas et al. | 435/290 |
| 5,457,031 A * | 10/1995 | Masse | 435/41 |
| 5,597,732 A | 1/1997 | Bryan-Brown | 435/290.4 |
| 5,766,876 A * | 6/1998 | Santiago et al. | 435/41 |
| 5,766,935 A | 6/1998 | Seagren | 435/290.2 |
| 5,843,769 A * | 12/1998 | Jonninen | |

FOREIGN PATENT DOCUMENTS

CH 684269 A5 * 8/1994

OTHER PUBLICATIONS

Gardener's Supply Company (commercial ad); "Green Magic Tumbler," www.gardners.com, 2 pages.

* cited by examiner

Primary Examiner—David A. Redding
(74) Attorney, Agent, or Firm—Marger, Johnson & McCollom P.C.

(57) ABSTRACT

A composting device includes a container that has baffles and an aeration port. The container is supported on an axle, for easy rotation. An internal aeration tube has a screen, and protrudes from the aeration port into the interior of the container, reaching into the mass of the stored organic material. Ambient air enters through the aeration port into the hollow core of the aeration tube, and from there into the container through ventilation openings in the surface of the aeration tube. The aeration tube is further supported by the axle, which runs through two opposite ventilation openings of the aeration tube. A break up bar breaks up the organic material.

13 Claims, 2 Drawing Sheets

COMPOSTING DEVICE WITH INTERNAL AERATION TUBE

BACKGROUND OF THE INVENTION

1. Field of the Invention

The present invention is related to the field of composting devices, i.e. devices that receive organic material to produce compost.

2. Description of the Related Art

Composting devices mainly include a container that receives organic material. The container typically has exposure holes, so that the organic material is exposed to air. After a long enough exposure, the organic material turns into compost.

A requirement of a composting device is that enough ambient air reaches the organic material that is stored inside. This requirement is usually met by making the exposure holes large, so as to accommodate a large mass of the organic material. If they become too large, a mesh is also placed on the container, to keep the decomposing material in.

A problem is that the organic composting materials can be seen through the mesh, and are unsightly while they are being decomposed. Additionally, there is an unpleasant odor, and pests tend to accumulate. The problem is exacerbated as the exposure holes are made larger for effectiveness. A draft of wind can carry the undesirable odor far. Making these holes smaller may reduce the odor, but also reduces the effectiveness of the composting device.

BRIEF SUMMARY OF THE INVENTION

The present invention overcomes these problems and limitations of the prior art.

Generally, the present invention provides a composting device that includes a container that need have only one aeration port. An aeration tube protrudes from the aeration port into the interior of the container, reaching into the mass of the organic material. Ambient air enters through the aeration port into the hollow core of the aeration tube, and from there into the container through ventilation openings in the surface of the aeration tube.

It will be appreciated that the composting device of the invention is effective at exposing a large mass of material to ambient air, while having only a small aeration port to the outside, which reduces the undesirable odor. Moreover, the aeration port is preferably at the bottom of the container, so it is also out of sight.

These and other features and advantages of the invention will become more readily apparent from the following detailed description of a preferred embodiment, which proceeds with reference to the drawings.

DETAILED DESCRIPTION OF THE PREFERRED EMBODIMENT(S)

Figure 1:
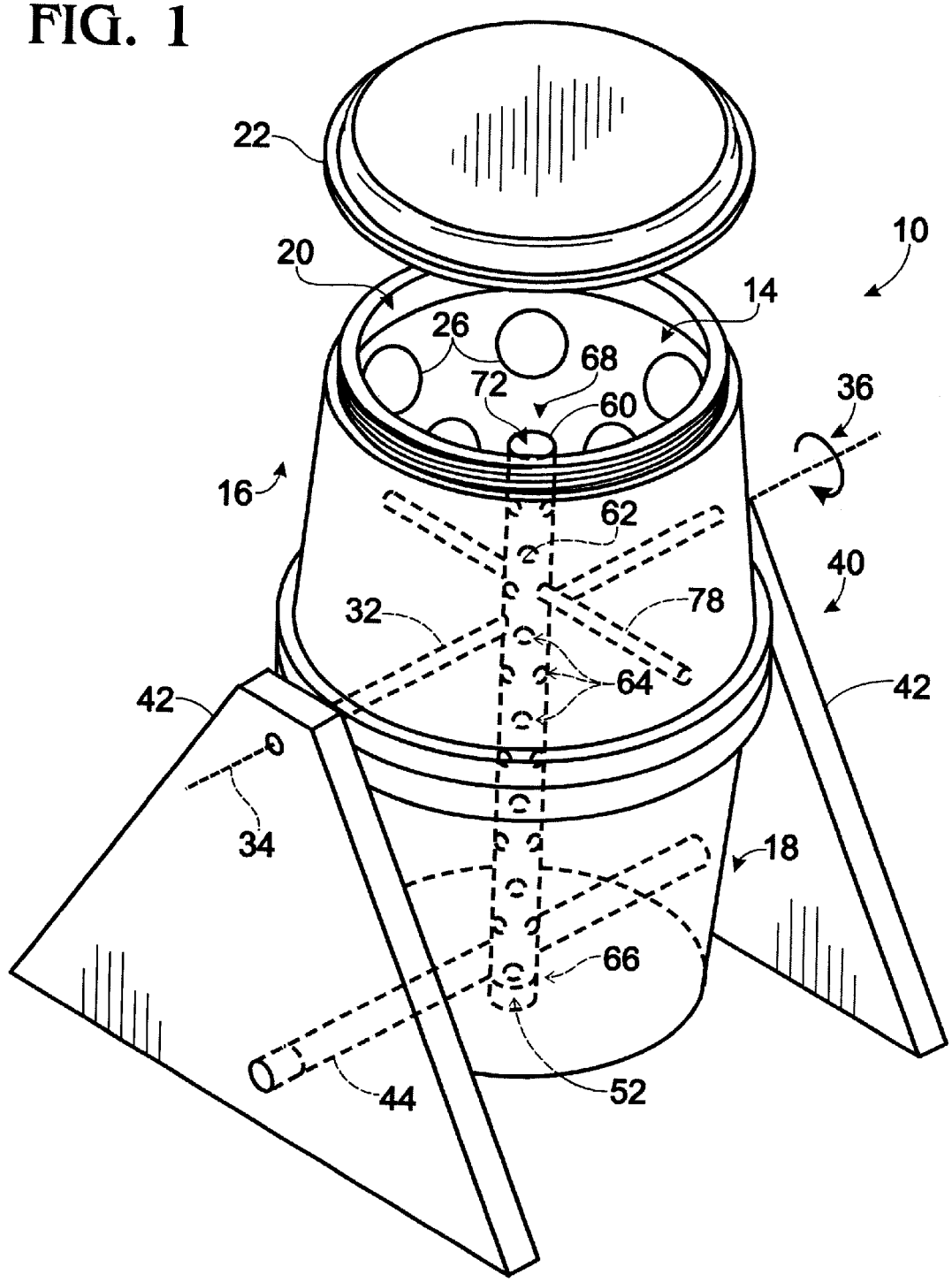
FIG. 1 is a perspective view of a composting device made according to the present invention.

As has been mentioned, the present invention provides a composting device. The preferred embodiment of the invention is now described with reference to FIGS. 1, 2 and 3.

Device 10 includes a container 12, also known as barrel, that defines an interior 14 for receiving the organic material. Container 12 can be made from any suitable material, such as metal, plastic, rubber, etc. Alternately, it can be made from a recycled container, such as a used 55-gallon pickle barrel.

Container 12 has a top side 16 and a bottom side 18. At top side 16, container 12 has an insertion opening 20 for receiving the organic material therethrough, and a lid 22 that is afterwards secured on insertion opening 20.

Figure 3:
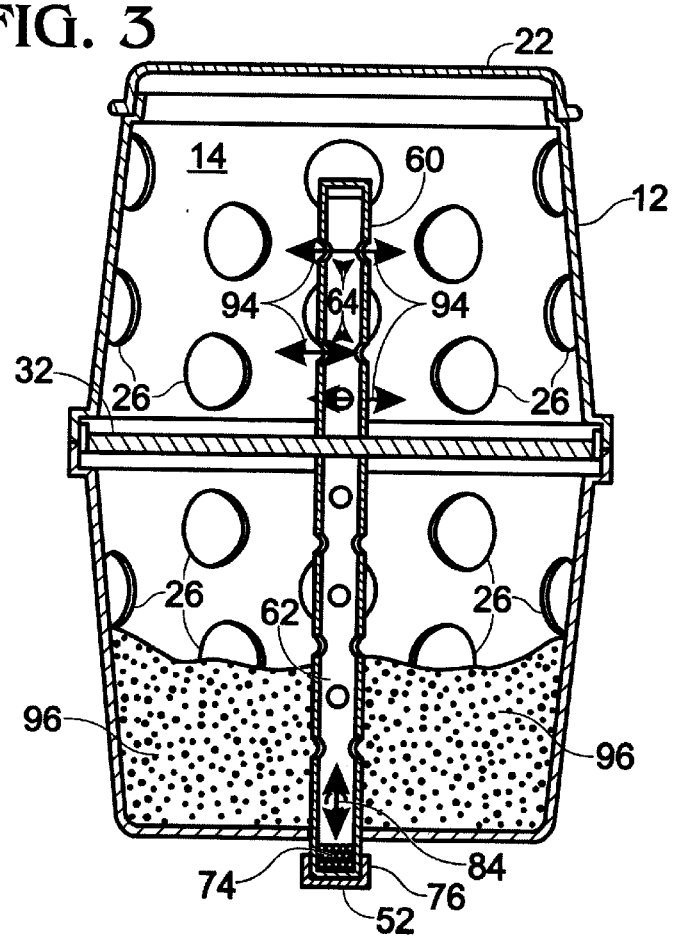
FIG. 3 is a diagram of a section view of the composting device of FIG. 1, for illustrating the flow of air.

In one embodiment, container 12 optionally includes baffles 26, which may be better seen by referring briefly to FIG. 3. These protrude in the interior of container 12, for cutting up the organic material, as it is moved with respect to the inside surface of container 12.

Returning to FIG. 1, device 10 preferably includes an axle 32. Axle 32 can be made from ¾ conduit. Container 12 is suspended on axle 32 and substantially balanced thereon, such that it can be rotated around an axis 34 according to arrow 36. Axle 32 is preferably provided on a stand 40, having legs 42 that are connected together by a horizontal beam 44.

Periodic rotation of the closed, full container 12 is recommended for better composting. This will cause the organic material to be moved with respect to the inside surface of container 12, and be broken up by the baffles.

Container 12 further defines an aeration port 52. Aeration port 52 is an opening in container 12 that permits air to come into container 12, in order to assist in the decomposition of the organic materials. It will be appreciated that only one aeration port 52 is necessary, although more can be included. As only one is necessary, the problem with the odors and pests is reduced.

Aeration port 52 may be at any place in the surface of container 12. Preferably, aeration port 12 is at bottom side 18 of container 12. It will be appreciated that this choice eliminates the unsightly view of the decomposing materials.

The invention further includes an internal aeration tube 60, which can be 2" diameter. Aeration tube 60 can be made from any suitable material, such as metal, rubber, plastic such as PVC, etc.

Aeration tube 60 has a hollow core 62 and ventilation openings 64, which can be of ½ to 1" diameter. Aeration tube 60 has a contact end 66 and an inside end 68. At inside end 68 there is preferably a stop 72 to terminate hollow core 62, although that is not necessary.

The idea is that aeration tube 60 protrudes from the aeration port into the interior 14 of container 12, thereby bringing fresh air to much of the inside mass of the decomposing organic material. As such, contact end 66 of aeration tube 60 is attached to container 12 at aeration port 52. Attachment is such that hollow core 62 is exposed to, and communicates with aeration port 52, and thus also with the ambient air that is outside container 12.

It is not critical that aeration tube 60 be attached to aeration port 52 by the contact end 66. In fact, aeration tube 60 may extend at least in part outside container 12.

One such embodiment is now discussed by referring briefly to FIG. 3. Aeration tube 60 extends in part outside container 12, and has a screen 74 surrounding its surface. Being at that location, the screen does not permit viewing of the organic material. A cap 76 may hold screen 74 in place.

Attachment of aeration tube 60 to aeration port 52 may be made in any convenient way. For example, the aeration tube 60 can have threads at the contact end 66, which are received matingly in threads at the aeration port 52 of the container 12.

The method of attachment will depend on the choice of materials. The strength of attachment will be taxed at the time that container 12 is rotated around axle 32. This is because the center of gravity of aeration tube 60 will be pushing in different directions with respect to aeration port 52. The invention alleviates this problem, and thus permits using a weak method of attachment, as follows.

According to another aspect of the invention, aeration tube 60 is coupled with axle 32, which in any way transverses interior 14 of container 12. As such, axle 32 absorbs much of the weight of aeration tube 60, even as container 12 and aeration tube 60 are rotated around axle 32. Therefore, much of the weight of aeration tube 60 does not have to be supported by the attachment at aeration port 52.

The preferred such coupling is now described with reference to FIG. 2. Preferably aeration tube 60 has a plurality of ventilation openings 64. Ventilation openings 64 are planned to be located such that axle 32 goes through to opposite ventilation openings 64. This can be planned in advance, by using the appropriate dimensions for axle 32, tube 60, ventilation openings 64, etc.

A commercial embodiment can provide parts of the invention separated for shipment. The ultimate user will assemble the device.

Returning to FIG. 1, device 10 additionally includes a breakup bar 78, which is attached to aeration tube 60. Breakup bar 78 is provided for further breaking up the organic material, as container 12 is rotated.

Figure 2:
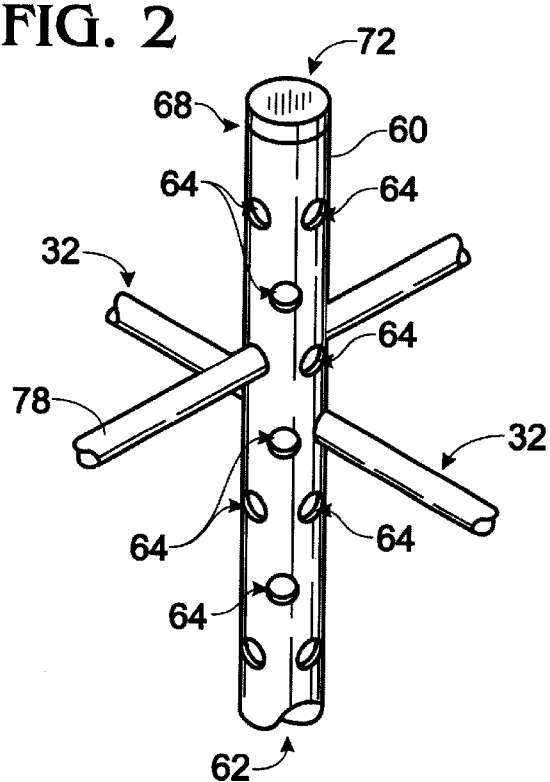
FIG. 2 is a close up view of a portion of an aeration tube of the composting device of FIG. 1.

Referring to FIG. 2, the preferred attachment is shown for breakup bar 78 to aeration tube 60. Breakup bar 78 may transverse a second set of ventilation openings 64.

Referring now to FIG. 3, the air flow for device 10 is now described. The axle and the stand are not shown, because they are not critical to the aeration process.

Ambient air from outside container 12, is exchanged with air in hollow core 62 of aeration tube 60, through aeration port 52 according to arrow 84. In addition, air in hollow core 62 is exchanged with air in interior 14 of container 12 through ventilation openings 64 according to arrows 94. Even if container 12 is fall organic material 96, air reaches it from the outside through ventilation openings 64.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device for composting organic material by exposure to ambient air comprising:
   a container having a side, a bottom, and an interior for receiving therein the organic material, the container further having an aeration port in the bottom; and
   an aeration tube protruding from the aeration port into the interior of the container, the tube having a hollow core that communicates with the ambient air through the aeration port, the tube further having at least one ventilation opening, the interior of the container thereby communicating with the ambient air through the ventilation opening and through the core.

2. The device of claim 1, wherein the container includes baffles protruding in the interior for breaking up the organic material.

3. The device of claim 2, further comprising a breakup bar attached to the aeration tube for breaking up the organic material.

4. The device of claim 1, further comprising a screen surrounding a portion of the aeration tube which is outside the bottom of the container.

5. The device of claims, further comprising a screen surrounding a portion of the aeration tube which is flush with the bottom of the container.

6. The device of claims further comprising a screen surrounding a portion of the aeration tube which is inside the bottom of the container.

7. The device of claim 1, further comprising a screen surrounding a bottom portion of the aeration tube.

8. A device for composting organic material by exposure to ambient air comprising:
   a container that defines an interior for receiving therein the organic material, the container further defining an aeration port;
   an aeration tube protruding from the aeration port into the interior of the container, the tube having a hollow core that communicates with the ambient air through the aeration port, the tube further having at least one ventilation opening, the interior of the container thereby communicating with the ambient air through the ventilation opening and through the core;
   baffles in the interior of the container for breaking up the organic material; and
   a screen surrounding a portion of the aeration tube which is outside the interior of the container.

9. The device of claim 8, further comprising:
   a breakup bar attached to the aeration tube for breaking up the organic material.

10. A device for composting organic material by exposure to ambient air comprising:
    a container that defines an interior for receiving therein the organic material, the container having a top side with an insertion opening for receiving the organic material, and a bottom side opposite the top side, the container further defining an aeration port at the bottom side;
    an aeration tube protruding from the aeration port into the interior of the container, the tube having a hollow core that communicates with the ambient air through the aeration port, the tube further having a plurality of ventilation openings, the interior of the container thereby communicating with the ambient air through the ventilation opening and through the core;
    an axle for supporting the container rotatably on a stand, the axle transversing the interior of the container and going through two first ventilation openings of the aeration tube; and
    a breakup bar going through two second ventilation openings of the aeration tube for breaking up the organic material.

11. The device of claim 10, wherein the container includes baffles protruding in the interior for breaking up the organic material.

12. The device of claim 10, further comprising: a cylindrical screen surrounding a portion of the aeration tube which is outside the interior of the container.

13. A device for composting organic material by exposure to ambient air comprising:

a container that defines an interior for receiving therein the organic material, the container having a top side with an insertion opening for receiving the organic material, and a bottom side opposite the top side, the container including baffles protruding in the interior for breaking up the organic material, the container further defining an aeration port at the bottom side;

an aeration tube protruding from the aeration port into the interior of the container, the tube having a hollow core that communicates with the ambient air through the aeration port, the tube further having a plurality of ventilation openings, the interior of the container thereby communicating with the ambient air through the ventilation opening and through the core;

an axle for supporting the container rotatably on a stand, the axle transversing the interior of the container and going through two first ventilation openings of the aeration tube;

a cylindrical screen surrounding a portion of the aeration tube which is outside the interior of the container; and a breakup bar going through two second ventilation openings of the aeration tube for further breaking up the organic material.

* * * * *

UNITED STATES PATENT AND TRADEMARK OFFICE
CERTIFICATE OF CORRECTION

PATENT NO. : 6,482,627 B1 Page 1 of 1
DATED : November 19, 2002
INVENTOR(S) : Dahlstrom It is certified that error appears in the above-identified patent and that said Letters Patent is hereby corrected as shown below:

Column 2,
Line 16, "from ¾ conduit" should read -- from 3/4" conduit --
Line 43, "of ½ to 1"" should read -- from ½" to 1" --

Column 3,
Line 39, "12 is fall organic" should read -- 12 is full organic --

Column 4,
Lines 17 and 20, "The device of claims" should read -- The device of claim 1 --

Signed and Sealed this

Twenty-sixth Day of August, 2003

JAMES E. ROGAN
*Director of the United States Patent and Trademark Office*